(12) United States Patent
Koyama

(10) Patent No.: US 6,515,797 B2
(45) Date of Patent: Feb. 4, 2003

(54) VIEWFINDER APPARATUS AND OPTICAL APPARATUS HAVING THE SAME

(75) Inventor: Takeshi Koyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/795,439

(22) Filed: Mar. 1, 2001

(65) Prior Publication Data

US 2001/0028500 A1 Oct. 11, 2001

(30) Foreign Application Priority Data

Mar. 9, 2000 (JP) ........................... 2000-065403

(51) Int. Cl.$^7$ ................ G02B 23/00; G02B 27/14
(52) U.S. Cl. .................. 359/431; 359/363; 359/630; 396/382; 396/385
(58) Field of Search ............... 359/743, 431–432, 359/421–422, 831–837, 619, 629–634; 396/148–152, 296, 354, 373, 374, 377, 382, 384–386; 348/333.01, 333.03, 333.09, 341, 344

(56) References Cited

U.S. PATENT DOCUMENTS

| | | | | |
|---|---|---|---|---|
| 4,085,412 A | * | 4/1978 | Yoshino | 396/307 |
| 4,494,147 A | * | 1/1985 | Komine | 348/341 |
| 4,949,107 A | | 8/1990 | Kitagishi et al. | 354/79 |
| 5,099,265 A | * | 3/1992 | Lee | 396/374 |
| 5,253,005 A | | 10/1993 | Koyama et al. | 354/152 |
| 5,392,082 A | | 2/1995 | Ikemori et al. | 354/195.12 |
| 5,581,318 A | | 12/1996 | Shiratori | 396/296 |
| 5,640,632 A | | 6/1997 | Koyama et al. | 396/382 |
| 5,666,577 A | * | 9/1997 | McIntyre et al. | 396/296 |
| 5,751,409 A | | 5/1998 | Koyama | 356/3.14 |

FOREIGN PATENT DOCUMENTS

| | | |
|---|---|---|
| JP | 7-43781 | 2/1995 |
| JP | 9-265102 | 10/1997 |
| JP | 10-20385 | 1/1998 |

* cited by examiner

Primary Examiner—Thong Nguyen
(74) Attorney, Agent, or Firm—Fitzpatrick, Cella, Harper & Scinto

(57) ABSTRACT

A viewfinder apparatus includes an objective lens unit, an eyepiece unit, an image display element for displaying an image formed by an image pick-up element, an illuminating device for illuminating the image display element, an optical system for introducing a light ray from the image display element illuminated by the illuminating device backward, and a reflecting member for introducing a light ray from the optical system to the eyepiece unit, and wherein the values of a focal length $f_r$ of the optical system and a focal length $f_e$ of the eyepiece unit satisfy the condition $1<f_e/f_r<6$.

12 Claims, 3 Drawing Sheets

VIEWFINDER APPARATUS AND OPTICAL APPARATUS HAVING THE SAME

BACKGROUND OF THE INVENTION

1. Field of the Invention

The present invention relates to a viewfinder apparatus and an optical instrument having the viewfinder apparatus, and in particular relates to a viewfinder apparatus in which, for example, an optical viewfinder (OVF) and an electronic viewfinder (EVF) are switchable so that a selected image from one of the finders can be observed in a visual field. The viewfinder apparatus is suitable for use in cameras, video cameras, electronic still cameras, and so forth.

2. Description of the Related Art

Hitherto, various types of viewfinder apparatuses have been proposed for optical instruments such as film cameras and video cameras.

For example, an Albada finder and a mark-type finder are well-known, so-called virtual image type finders, in which a virtual image is formed by an objective lens so as to be observed via an eyepiece.

FIG. 3 is a schematic view of essential parts of a conventional mark-type finder; the drawing shows an objective lens 11 having a negative refracting power, an eyepiece 12 having a positive refracting power, a field frame 13, a mirror 16, a target lens (a target lens optical system) 15, and a half mirror 14.

When observing an object, an inversed Galilean type finder comprising the objective lens 11 and the eyepiece 12 is used. A light ray passing through a transparent portion of the field frame 13 is reflected by the mirror 16 and is concentrated by the target lens 15 so as to be introduced to the eyepiece 12 via the half mirror 14, thereby being superimposed on a virtual image of the object.

The target lens 15 serves to eliminate a sense of incongruity of an object visibility through the finder by causing an image in the field frame 13 to have a predetermined visibility. In the vicinity of the center of the field frame 13, a display such as a distance-measuring mark may be provided.

In a viewfinder apparatus, a liquid crystal display element is used as a display of a finder field frame (field frame), as disclosed in Japanese Patent Laid-Open No. 7-43781, U.S. Pat. No. 5,581,318, and Japanese Patent Laid-Open No. 9-265120, for example. Ambient light rays are normally utilized as a light source thereof in a mark-type finder.

In Japanese Patent Laid-Open No. 10-20385, a mark-type finder is proposed in which a liquid crystal display element has a back light device, and the field frame is displayed by back-lighting due to the back light device.

On the other hand, in video cameras, etc., a so-called EVF (electric viewfinder) is in general use, in which an image of an object is formed in an image pick-up element such as a CCD in an image pick-up system and image information is displayed in a liquid crystal display element by using an electric signal from the image pick-up element so as to be observed through the viewfinder system.

In the above-mentioned EVF as a viewfinder apparatus, an observed finder image is a picked-up object image itself, so that it has a merit of having no parallax. In contrast to this, however, considerable electric power is required for driving the liquid crystal display element. In optical instruments such as electronic still cameras, since the compactness thereof is important, reduction in capacity of a battery equipped in the instrument is required. In video cameras, an ordinary optical viewfinder (OVF) other than the EVF is also used.

In an optical instrument having both the EVF and OVF, since an optical viewfinder is independently constructed separately from a liquid crystal display element for the EVF, a large space is needed and the efficiency in space savings is also low, so that the size of the entire apparatus is prone to increase.

SUMMARY OF THE INVENTION

Accordingly, it is an object of the present invention to provide a viewfinder apparatus and an optical instrument using the apparatus in which space is efficiently used, enabling the entire apparatus to be miniaturized, and the apparatus is switchable between modes of an OVF and an EVF.

In order to achieve the above object, in accordance with a first aspect of the present invention, there is provided a viewfinder apparatus comprising: an objective lens unit; an eyepiece unit; an image display element for displaying an image formed by an image pick-up element; an illuminating device for illuminating the image display element; an optical system for introducing light backward from the image display element which is illuminated by the illuminating device; and a reflecting member for introducing light from the optical system to the eyepiece unit, wherein the values of a focal length fr of the optical system and a focal length $f_e$ of the eyepiece unit satisfy the condition $1 < f_e/f_r < 6$.

Preferably, the reflecting member is arranged between the objective lens unit and the eyepiece unit and is rotatable about a predetermined axis.

It is preferable that in the optical system, the viewfinder apparatus be switchable between a case in which observation of a luminous flux from the illuminated image display element as the image via the eyepiece unit is provided by reflecting the luminous flux at the reflecting member, and a case in which observation of an image formed by the objective lens unit via the eyepiece unit is provided by moving the reflecting member from an optical path between the objective lens unit and the eyepiece unit.

The apparatus may preferably further comprise a shielding member which is insertable into and detachable from an optical path between the objective lens unit and the reflecting member, and wherein the reflecting member may be a half mirror.

Preferably, the shielding member is arranged between the objective lens unit and the half mirror, and wherein the viewfinder apparatus is switchable between a case in which observation of a luminous flux from the illuminated image display element as the image via the eyepiece unit is provided by reflecting the luminous flux at the half mirror, and a case in which observation of an image formed by the objective lens unit via the half mirror and the eyepiece unit is provided by moving the shielding member from an optical path between the objective lens unit and the half mirror.

The optical system may preferably be a target lens optical system for magnifying a luminous flux from the illuminated image display element as an image.

Preferably, the target lens optical system has a face having a negative refracting power.

In order to achieve the above object, in accordance with a second aspect of the present invention, there is provided a viewfinder apparatus comprising: an electric viewfinder for observing a luminous flux from an illuminated image display element for displaying an image formed by an image pick-up element as the image via a predetermined optical system and an eyepiece unit; and an optical viewfinder for observing an image formed by an objective lens unit via the eyepiece unit, wherein the electric viewfinder and the optical viewfinder are switchably used, and wherein the values of a focal length $f_r$ of the optical system and a focal length $f_e$ of the eyepiece unit satisfy the condition $1<f_e/f_r<6$.

Preferably, a rotatable reflecting member is arranged along an optical path between the objective lens unit and the eyepiece unit, and wherein the electric viewfinder observes a luminous flux from the illuminated image display element as the image by reflecting the luminous flux at the reflecting member while the optical viewfinder observes an image formed by the objective lens unit by moving the rotatable reflecting member from the optical path.

Preferably, a half mirror is provided along an optical path between the objective lens unit and the eyepiece unit and an insertable and detachable shielding member is provided along an optical path between the objective lens unit and the half mirror, and wherein the electric viewfinder observes a luminous flux from the illuminated image display element as the image by reflecting the luminous flux at the half mirror while the optical viewfinder observes an image formed by the objective lens unit via the half mirror by moving the shielding member from the optical path.

An optical instrument may preferably comprise a viewfinder apparatus according to the first aspect of the present invention and the image pick-up element for forming an image of an object via an image pick-up optical system.

An optical instrument may preferably comprise a viewfinder apparatus according to the second aspect of the present invention and the image pick-up element for forming an image of an object via an image pick-up optical system.

According to the present invention, a viewfinder apparatus and an optical instrument using the same can be achieved, in which the entire apparatus can be miniaturized and the OVF and the EVF are switchable.

Further objects, features and advantages of the present invention will become apparent from the following description of the preferred embodiments with reference to the attached drawings.

DESCRIPTION OF THE PREFERRED EMBODIMENTS

Figure 1:
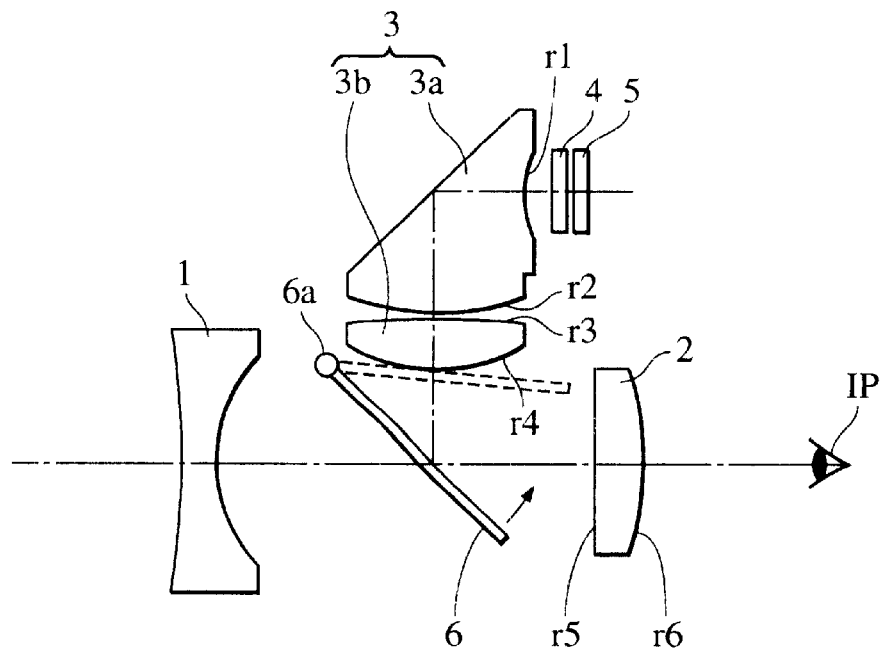
FIG. 1 is a sectional view of essential parts of a first embodiment according to the present invention.

FIG. 1 is a sectional view of essential parts of a first embodiment according to the present invention. FIG. 1 shows only a viewfinder apparatus portion of an optical instrument such as a video camera or an electronic still camera. The drawing shows an objective lens 1 having a negative refracting power and an eyepiece 2 having a positive refracting power for observing a magnified virtual image formed by the objective lens 1 from an eye point IP.

A reflecting member (mirror) 6 is rotatable about an axis of rotation 6a and is rotatable between a position indicated by a solid line in the drawing and a position indicated by a dotted line. A liquid crystal display element (image display element) 4 has an optical modulating function based on information obtained from an image pick-up system (not shown). A back light device 5 illuminates the liquid crystal display element 4. A target lens optical system 3 introduces a luminous flux from the liquid crystal display element 4 to the reflecting member 6. The target lens optical system 3 comprises a prism body 3a having a negative refracting power on a plane of incidence thereof and a lens 3b having a positive refracting power on an exit plane thereof.

FIG. 1 shows a state in an electric viewfinder (EVF) mode. That is, an image of an object is formed in an image pick-up element such as a CCD by an image pick-up system so as to modulate the liquid crystal display element 4 based on electric image information from the CCD. A luminous flux based on image information from the liquid crystal display element 4 illuminated by a luminous flux from the back light device 5 is formed to have a virtual image in the target lens optical system 3. The virtual image is magnified by the eyepiece 2 via the reflecting member 6.

In FIG. 1, a luminous flux from the objective lens 1 is shielded by the reflecting member 6 so as to have an EVF state.

In FIG. 1, when the reflecting member 6 is moved from a position indicated by a solid line to a position indicated by a dotted line, a luminous flux from the liquid crystal display element 4 is shielded. At this time, an inversed Galilean type viewfinder (OVF) is constructed, in which an object image from the objective lens 1 is observed via the eyepiece 2.

Figure 3:
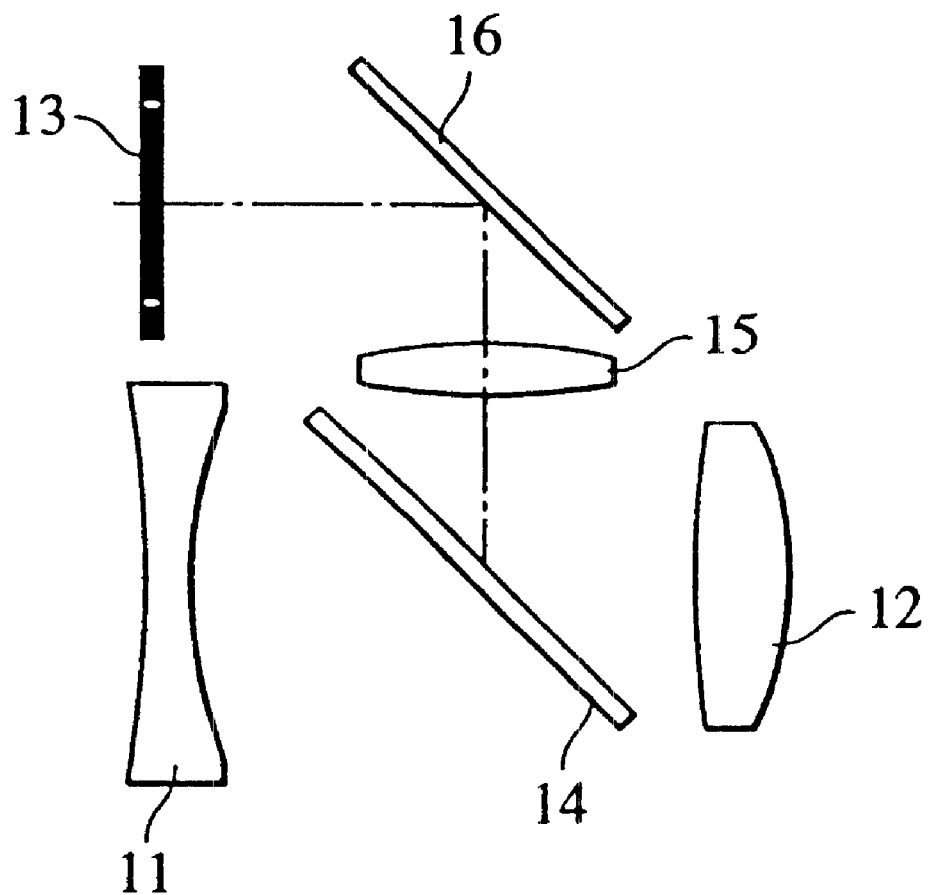
FIG. 3 is a sectional view of essential parts of a conventional Albada-type viewfinder.

In this embodiment, a luminous flux from the target lens optical system 3 is bent to the eyepiece 2 by the reflecting member 6. Therefore, in an inversed Galilean type viewfinder as in the embodiment, in which the outer diameter of the objective lens 1 is larger than that of the eyepiece 2, the liquid crystal display element 4 and the back light device 5 can be arranged in the space around the eyepiece 2, which is comparatively spacious, so that the viewfinder is efficiently arranged in a compact size. The display element is arranged in the object side relative to a reflecting face of the prism body 3a, as in a conventional mark-type viewfinder shown in FIG. 3, and a luminous flux is bent in the direction opposite that-in the conventional viewfinder.

The display size of a liquid crystal display element for an EVF is normally 0.4 inches or more; however, when savings in electric power and simplification are pursued, the order of 0.2 to 0.3 inches of a liquid crystal display element in size is required. However, it is also necessary for this purpose to secure a magnification in the target lens optical system (viewfinder magnification), which is a largely different point from a conventional mark-type viewfinder. In the present embodiment, since a small-sized liquid crystal display element is used as mentioned above, a focal length $f_r$ of the target lens optical system and a focal length $f_e$ of the eyepiece satisfy the condition (1).

$$1<f_e/f_r<6 \tag{1}$$

When $f_e/f_r$ decreases below the lower limit of the condition (1), it becomes difficult to display the small-sized liquid crystal display element at a predetermined magnification, and the entire viewfinder tends to become larger in size. When $f_e/f_r$ exceeds the upper limit, it becomes difficult to satisfactorily correct aberration of the target lens optical system.

In addition, both the face r1 of the prism body 3a and the face r3 of the lens 3b have negative refracting power in the present embodiment, and thereby aberration correction is favorably performed when the target lens optical system is formed so as to display the small-sized liquid crystal display element 4 after magnification.

It is further preferable that $f_e/f_r$ in the condition (1) satisfy the condition (1a).

$$1.5<f_e/f_r<5 \quad (1a)$$

Figure 2:
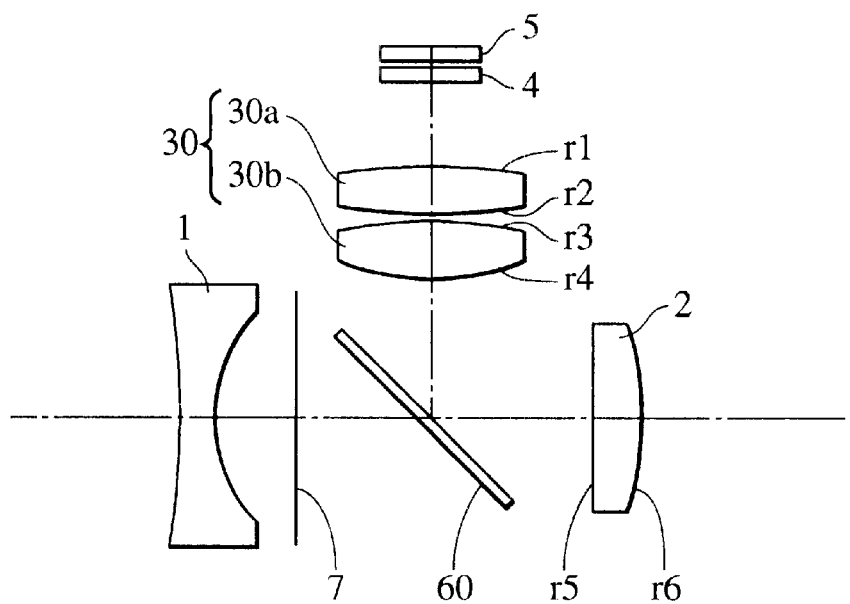
FIG. 2 is a sectional view of essential parts of a second embodiment according to the present invention.

FIG. 2 is a sectional view of essential parts of a second embodiment according to the present invention. In comparison with the first embodiment shown in FIG. 1, the different points in this embodiment are the structure of a target lens optical system 30, the arrangement of the liquid crystal display element 4 and the back light device 5, newly arranging a shield member 7 which is insertable into and removable from an optical path, arranging a fixed half mirror 60 instead of the prior-disclosed reflecting member, and so forth. The other structures are the same as those in the first embodiment. The target lens optical system 30 comprises two lenses 30a and 30b having positive refracting power.

FIG. 2 shows the EVF mode, in which a luminous flux from the objective lens 1 is shielded by the shielding member 7, and image information based on the liquid crystal display element 4 is observed via the target lens optical system 30, the half mirror 60, and the eyepiece 2.

When the apparatus is used in the OVF mode, the back light device 5 is turned off and the shielding member 7 is removed out of the optical path. Thus, a luminous flux from the objective lens 1 based on an object is introduced to the eyepiece 2 via the half mirror 60, thereby an object image (finder image) is observed.

Next, numerical examples of the target lens optical system and the eyepiece in the viewfinder according to the present invention will be shown.

In the numerical examples, an optical path is assumed, which is developed when the reflecting member 6 and the half mirror 60 are omitted. In the numerical examples, ri denotes the radius of curvature of the ith face in the order from the liquid crystal display element as shown in the drawings; di denotes the ith thickness of the optical member and the air space in the order from the liquid crystal display element; and ni and vi represent the ith refractive index and the ith Abbe constant of the d-ray in the optical member material in the order from the liquid crystal display element, respectively.

| First Embodiment | | | |
|---|---|---|---|
| r1 = −50 | d1 = 11 | n1 = 1.492 | v1 = 57 |
| r2 = −16 | d2 = 0.5 | n2 = 1 | |
| r3 = −100 | d3 = 2 | n3 = 1.492 | v2 = 57 |
| r4 = −14 | d4 = 12 | n4 = 1 | |
| r5 = 477 | d5 = 2.5 | n5 = 1.492 | v3 = 57 |
| r6 = −16.8 | | n6 = 1 | |
| $f_e$ = 33.06 | | $f_r$ = 18.41 | |
| | $f_e/f_r$ = 1.8 | | |

| Second Embodiment | | | |
|---|---|---|---|
| r1 = 20 | d1 = 2 | n1 = 1.492 | v1 = 57 |
| r2 = −40 | d2 = 0.5 | n2 = 1 | |
| r3 = 15 | d3 = 4 | n3 = 1.492 | v2 = 57 |
| r4 = −15 | d4 = 15 | n4 = 1 | |
| r5 = ∞ | d5 = 3.4 | n5 = 1.492 | v3 = 57 |
| r6 = −23.6 | | n6 = 1 | |
| $f_e$ = 48 | | $f_r$ = 10.78 | |
| | $f_e/f_r$ = 4.45 | | |

Next, an embodiment in which the viewfinder apparatus according to the first embodiment is applied to an optical instrument will be described with reference to FIG. 4.

Figure 4:
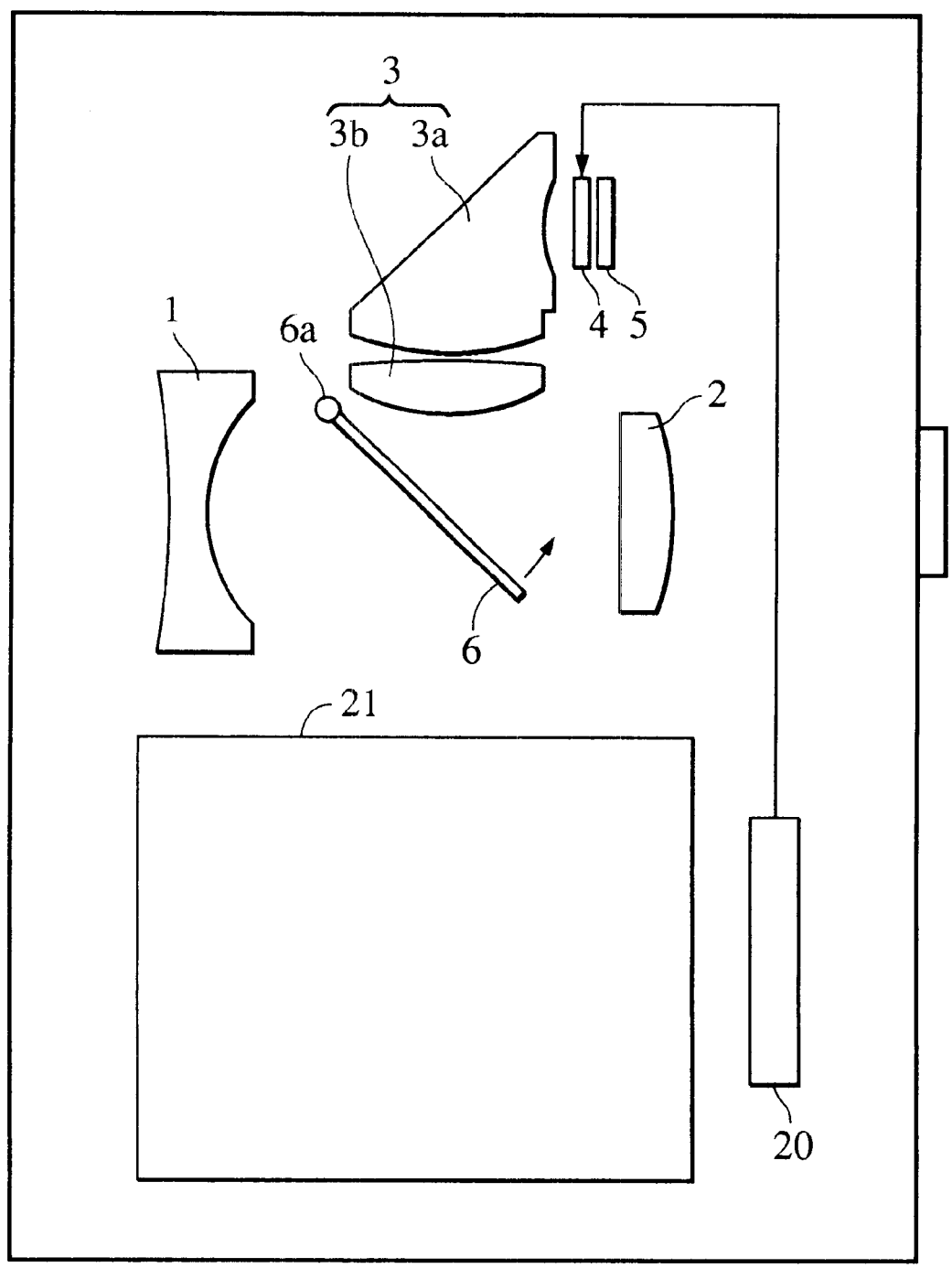
FIG. 4 is a sectional view of essential parts of an optical instrument having a viewfinder apparatus according to the first embodiment of the present invention equipped therewith.

FIG. 4 is a sectional view of essential parts of a digital camera. FIG. 4 shows a viewfinder apparatus in which elements 1 to 6 are the same as that shown in FIG. 1, an image pick-up element 20 such as a CCD, and an image pick-up optical system 21. The image information formed in the image pickup element 20 is sent to the liquid crystal display element 4.

By applying the viewfinder apparatus according to the first or the second embodiment to an optical instrument in such a manner, a compact optical instrument can be achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A viewfinder apparatus comprising:

an objective unit;

an eyepiece unit;

an image display element for displaying an image;

an optical system for introducing light from the image display element; and a reflecting member for introducing light from the optical system to the eyepiece unit, the reflecting member being arranged between the objective unit and the eyepiece unit, wherein the values of a focal length $f_r$ of the optical system and a focal length $f_e$ of the eyepiece unit satisfy the condition $1<f_e/f_r<6$.

2. An apparatus according to claim 1, wherein the reflecting member is rotatable about a predetermined axis.

3. An apparatus according to claim 2, wherein the viewfinder apparatus is switchable between a case in which observation of light from the image display element as the image is provided via the eyepiece unit by reflecting the light at the reflecting member, and a case in which observation of an image formed by the objective unit is provided via the eyepiece unit by moving the reflecting member from an optical path between the objective unit and the eyepiece unit.

4. An apparatus according to claim 1, further comprising a shielding member which is insertable into and detachable from an optical path between the objective unit and the reflecting member and wherein the reflecting member is a half mirror.

5. An apparatus according to claim 4, wherein the shielding member is arranged between the objective unit and the half mirror, and wherein the viewfinder apparatus is switchable between a case in which observation of light from the image display element as the image is provided via the eyepiece unit by reflecting the light at the half mirror, and a case in which observation of an image formed by the objective unit is provided via the half mirror and the eyepiece unit by moving the shielding member from an optical path between the objective unit and the half mirror.

6. An apparatus according to claim 1, wherein the optical system is a target lens optical system for magnifying the displayed image on the image display element.

7. An apparatus according to claim 6, wherein the target lens optical system has a face having a negative refracting power.

8. An optical instrument comprising:
 a viewfinder apparatus according to claim 1; and
 an image pick-up element that forms an image of an object via an image pick-up optical system.

9. A viewfinder apparatus comprising:
 an electric viewfinder for observing light from an image display element for displaying an image formed by an image pick-up element as the image via a predetermined optical system and an eyepiece unit; and
 an optical viewfinder for observing an image formed by an objective lens unit via the eyepiece unit,
 wherein the electric viewfinder and the optical viewfinder are switchably used, and
 wherein the values of a focal length $f_r$ of the optical system and a focal length $f_e$ of the eyepiece unit satisfy the condition $1<f_e/f_r<6$.

10. An apparatus according to claim 9, wherein a rotatable reflecting member is arranged along an optical path between the objective unit and the eyepiece unit, and wherein the electric viewfinder observes light from the image display element as the image by reflecting the at the reflecting member while the optical viewfinder observes an image formed by the objective unit by moving the rotatable reflecting member from the optical path.

11. An apparatus according to claim 9, wherein a half mirror is provided along an optical path between the objective unit and the eyepiece unit and an insertable and detachable shielding member is provided along an optical path between the objective unit and the half mirror, and wherein the electric viewfinder observes light from the image display element as the image by reflecting the light at the half mirror while the optical viewfinder observes an image formed by the objective unit via the half mirror by moving the shielding member from the optical path.

12. An optical instrument comprising:
 a viewfinder apparatus according to claim 9; and
 an image pick-up element for forming an image of an object via an image pick-up optical system.

* * * * *

UNITED STATES PATENT AND TRADEMARK OFFICE
CERTIFICATE OF CORRECTION

PATENT NO.      : 6,515,797 B2
DATED           : February 4, 2003
INVENTOR(S)     : Takeshi Koyama It is certified that error appears in the above-identified patent and that said Letters Patent is hereby corrected as shown below:

<u>Column 2,</u>
Line 8, "TNVENTION" should read -- INVENTION --.

<u>Column 4,</u>
Line 43, "that-in" should read -- that in --.

<u>Column 5,</u>
Line 56, "$f_\theta = 33.06$" should read -- $f_e = 33.06$ --.
Line 57, "$f_\theta/f_r = 1.8$" should read -- $f_e/f_r = 1.8$ --.

<u>Column 6,</u>
Line 7, "$f_\theta = 48$" should read -- $F_e = 48$ --.
Line 8, "$f_\theta/f_r = 4.45$" should read -- $F_e/F_r = 4.45$ --.

<u>Column 8,</u>
Line 7, "the" (2<sup>nd</sup> occurrence) should read -- the light --.

Signed and Sealed this

Twenty-first Day of October, 2003

JAMES E. ROGAN
*Director of the United States Patent and Trademark Office*